(12) United States Patent
Adema et al.

(10) Patent No.: US 7,487,913 B2
(45) Date of Patent: Feb. 10, 2009

(54) METHOD AND SYSTEM FOR REDUCING WASTE DUE TO PRODUCT SPOILAGE WITHIN A GROCERY ENVIRONMENT

(75) Inventors: Roger Lee Adema, Raleigh, NC (US); Robert S. Hoblit, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 11/457,021

(22) Filed: Jul. 12, 2006

(65) Prior Publication Data

US 2008/0011836 A1 Jan. 17, 2008

(51) Int. Cl.
*G06K 15/00* (2006.01)
(52) U.S. Cl. ...................... 235/383; 235/385
(58) Field of Classification Search ................. 235/451, 235/492, 383, 385; 340/540; 705/28
See application file for complete search history.

(56) References Cited

U.S. PATENT DOCUMENTS

| | | | |
|---|---|---|---|
| 6,032,127 A | 2/2000 | Schkolnick et al. | |
| 6,294,997 B1 | 9/2001 | Paratore et al. | |
| 6,982,640 B2 * | 1/2006 | Lindsay et al. | 340/540 |
| 2005/0049914 A1 | 3/2005 | Parish | |
| 2005/0131578 A1 | 6/2005 | Weaver | |
| 2006/0289637 A1 * | 12/2006 | Brice et al. | 235/385 |

* cited by examiner

*Primary Examiner*—Michael G Lee
*Assistant Examiner*—Rafferty Kelly
(74) *Attorney, Agent, or Firm*—Duke W. Yee; Jason O. Piche; A. M. Thompson (57) ABSTRACT

A computer implemented method, data processing system, and computer program product for tracking time sensitive items in a container. A barcode scanned item is placed into a container. The system stores the time of the scan and links the item identification number scanned to the inventory control system. As the time since the item was scanned increases, the system determines whether the item has exceeded a time-based alert threshold. Responsive to exceeding the time-based alert threshold, personnel are alerted to the abandoned container. The system provides data to the personnel to aid in dispositioning the item following abandonment.

10 Claims, 9 Drawing Sheets

INVENTORY CONTROL SYSTEM DATABASE

| 610 SKU | 602 PRODUCT | 604 PRICE | 606 TYPE | 608 WEIGHT | 612 TIME SENSITIVITY | 616 LOCATION | 614 SUPERSEDING FACTOR* | ... |
|---|---|---|---|---|---|---|---|---|
| 111111 | GREEN BEANS | 0.54 | CANNED | 10 oz | 1 | SHELF | 0 | ... |
| 222222 | PLAIN YOGURT | 0.98 | SINGLE | 4 oz | 4 | REFRIG | 0 | ... |
| 333333 | FILET MIGNON | 29.73 | BUTCHER | 12 oz | 4 | REFRIG | 0 | ... |
| 444444 | ICE | 1.99 | BAG | 5 lbs | 5 | FREEZER | 1 | ... |
| 555555 | POPSICLE | 0.52 | SINGLE | 2 oz | 5 | FREEZER | 1 | ... |
| 666666 | SUDAFED | 16.93 | PHARMA | 2 oz | 1 | PHARMA | 1 | ... |
| ... | ... | ... | ... | ... | ... | ... | ... | ... |

FIG. 7

| SHOPPING CART 278 HISTORY | | CUST LOGIN | | | 714 | 716 | |
|---|---|---|---|---|---|---|---|
| XX3929730004 | | 12:58:04 | | | NOTIFY ABANDONED | ALERT PERSONNEL | ... |
| | | | | | 13:26:09 | 16:26:09 | ... |
| SKU | PRODUCT | PRICE | SCANNED TIME | TIME SENSITIVITY | ITEM LOCATION | SUPERSEDING FACTOR* | ... |
| 111111 | GREEN BEANS | 0.54 | 13:00:00 | 1 | 17B | 0 | ... |
| 112222 | LIMA BEANS | 0.54 | 13:02:00 | 1 | 17B | 0 | ... |
| 113333 | CORN | 0.52 | 13:03:00 | 1 | 17B | 0 | ... |
| 113333 | CORN | 0.52 | 13:03:15 | 1 | 17B | 0 | ... |
| 113333 | CORN | 0.52 | 13:03:19 | 1 | 17B | 0 | ... |
| 114444 | PEAS | 0.67 | 13:05:00 | 1 | 17B | 0 | ... |
| 114444 | PEAS | 0.67 | 13:05:40 | 1 | 17B | 0 | ... |
| 114444 | PEAS | 0.67 | 13:06:09 | 1 | 17B | 0 | ... |
| | TOTAL | (4.65) | | | | | |
| ... | ... | ... | ... | ... | ... | ... | ... |

CUSTOMER ID — 704
706
708
712
710
702

*FIG. 8A*

| SHOPPING CART 129 HISTORY | | | | | | |
|---|---|---|---|---|---|---|
| CUSTOMER ID | YY349860002 | | 9:38:03 | | | |
| SKU | PRODUCT | PRICE | SCANNED TIME | TIME SENSITIVITY | NOTIFY ABANDONED 814 | ALERT PERSONNEL 816 |
| | | | | | 10:19:02 | 10:29:02 |
| | | | | | ITEM LOCATION | SUPERSEDING FACTOR |
| 222222 | PLAIN YOGURT | 0.98 | 9:39:02 | 4 | 23A | 0 |
| 114444 | PEAS | 0.67 | 9:49:02 | 1 | 17B | 0 |
| 113333 | CORN | 0.52 | 9:59:02 | 1 | 17B | 0 |
| | TOTAL | (2.17) | | | | |
| ... | ... | ... | ... | ... | ... | ... |

802 — SHOPPING CART 129 HISTORY
804 — CUSTOMER ID
806 — SKU
812 — (row marker)

FIG. 8B

| 802 ⎯ SHOPPING CART 129 HISTORY | | | | | 814 ⎯ | 816 ⎯ | |
|---|---|---|---|---|---|---|---|
| CUSTOMER ID | YY349860002 | | 9:38:03 | | NOTIFY ABANDONED | ALERT PERSONNEL | ⋮ |
| | | | | | 10:19:02 | 13:19:02 | ⋮ |
| SKU | PRODUCT | PRICE | SCANNED TIME | TIME SENSITIVITY | ITEM LOCATION | SUPERSEDING FACTOR | ⋮ |
| 222222 | PLAIN YOGURT | 0.98 | 9:39:02 | 4 | 23A | 0 | ⋮ |
| 114444 | PEAS | 0.67 | 9:49:02 | 1 | 17B | 0 | ⋮ |
| 113333 | CORN | 0.52 | 9:59:02 | 1 | 17B | 0 | ⋮ |
| | | | | | | | ⋮ |
| | | | | | | | ⋮ |
| | | | | | | | ⋮ |
| | | | | | | | ⋮ |
| | TOTAL | (2.17) | | | | | ⋮ |
| ⋯ | ⋯ | ⋯ | ⋯ | ⋯ | ⋯ | ⋯ | ⋮ |

804 ⎯ (CUSTOMER ID column)
806 ⎯ (SKU column)
812 ⎯ (113333 row)

FIG. 8C

| SHOPPING CART 129 HISTORY | | | | | 814 | 816 |
|---|---|---|---|---|---|---|
| CUSTOMER ID | YY349860002 | | 9:38:03 | | NOTIFY ABANDONED | ALERT PERSONNEL |
| | | | | | 10:19:02 | 10:29:02 |
| SKU | PRODUCT | PRICE | SCANNED TIME | TIME SENSITIVITY | ITEM LOCATION | SUPERSEDING FACTOR |
| 222222 | PLAIN YOGURT | 0.98 | 9:39:02 | 4 | 23A | 0 |
| 114444 | PEAS | 0.67 | 9:49:02 | 1 | 17B | 0 |
| 113333 | CORN | 0.52 | 9:59:02 | 1 | 17B | 0 |
| 333333 | FILET MIGNON | 29.95 | 10:09:02 | 4 | 21B | 0 |
| | | | | | | |
| | TOTAL | (32.12) | | | | |
| ... | ... | ... | ... | ... | ... | ... |

804 — CUSTOMER ID
806 — SKU
812 — (row marker)
813 — (row marker)

FIG. 9

| | SHOPPING CART 882 HISTORY | | | | | | |
|---|---|---|---|---|---|---|---|
| CUSTOMER ID | 22349860002 | | 9:38:03 | | | NOTIFY ABANDONED 10:19:02 | ALERT PERSONNEL 10:19:02 |
| SKU | PRODUCT | PRICE | SCANNED TIME | TIME SENSITIVITY | | ITEM LOCATION | SUPERSEDING FACTOR |
| 444444 | BAG ICE | 1.99 | 9:39:02 | 5 | | FREEZER12 | 1 |
| | | | | | | | |
| | TOTAL | (1.99) | | | | | |
| ... | ... | ... | ... | ... | ... | ... | ... |

902

METHOD AND SYSTEM FOR REDUCING WASTE DUE TO PRODUCT SPOILAGE WITHIN A GROCERY ENVIRONMENT

BACKGROUND OF THE INVENTION

1. Field of the Invention

The present invention relates generally to goods distribution or delivery and more specifically relates to a method and system for tracking time sensitive items. Still more specifically, the invention relates to identification of shopping carts containing perishable goods abandoned in a grocery store.

2. Description of the Related Art

There are several categories of products within a grocery store that are considered time sensitive: frozen foods, refrigerated items such as meat and dairy products, and produce. Time sensitive items are perishable items. Grocers can anticipate that a certain amount of spoilage of these products will occur naturally, but spoilage occurs more rapidly when the items are taken off the shelf, placed in a cart, and then left in the aisle at room temperature if the customer decides to abandon the cart.

Most modern retail stores use point of sale (POS) systems for providing customers with better, faster service. A point of sale system may generally have one or more automated check-out terminals and on cart mobile barcode scanners, which are capable of sensing and interpreting the bar code, printed on each item of merchandise to be checked out.

A barcode is a machine-readable representation of information in a visual format on a surface. Originally barcodes stored data in the widths and spacings of printed parallel lines, but today they also come in patterns of dots, concentric circles, and hidden in images. Barcodes can be read by optical scanners called barcode scanners. A barcode scanner is a computer peripheral for reading barcodes printed on various surfaces. A barcode scanner generally consists of a light source, a lens, and a photo conductor translating optical impulses into electrical ones. Additionally, nearly all barcode scanners currently produced contain decoder circuitry analyzing the barcode's image data provided by the photo conductor and sending the barcode's content to the output port of the scanner.

Contained in the bar code is the item's Stock Keeping Unit (SKU) code. Each of the check-out terminals and mobile scanners is connected to a computer network, which processes the SKU information. The network computer's database is called the inventory control database. The inventory control database includes a list of items of merchandise in the store, a SKU for each of these items, and various types of information, including pricing and inventory information, associated with each SKU. When a customer is ready to make a purchase, store personnel or the customer simply uses a barcode scanner to sense the bar code on each of the customer's selections. The computer interprets the SKU contained in the bar code, looks up the price for each item, keeps a running total of the purchase, and communicates with the inventory control system. A container, as used herein, is a shopping cart, a delivery truck, a restaurant salad bar or any receptacle that holds time sensitive items.

An inventory control system is an integrated package of software and hardware used in warehouse operations, retail stores and elsewhere, to monitor the quantity, location and status of inventory. Inventory control systems may also refer to just the software components. Modern inventory control systems rely upon barcodes, and, optionally, Radio Frequency Identification (RFID) tags, to provide automatic identification of inventory objects. Radio Frequency Identification (RFID) is an automatic identification method, relying on storing and remotely retrieving data using devices called RFID tags or transponders. An RFID tag is a small object that can be attached to or incorporated into a product, a shopping cart, or a mobile barcode scanner. RFID tags contain silicon chips and antennas to enable them to receive and respond to radio-frequency queries from an RFID transceiver.

Real time inventory control systems use wireless, mobile terminals to record inventory transactions at the moment they occur. A wireless LAN transmits the transaction information to an inventory control database.

One type of real time inventory control system is a shopping cart based personal shopping system. The electronic personal shopping system includes a mobile terminal, which may be either hand-held or mounted on a shopping cart. The mobile terminal is a microprocessor controlled unit and includes a portable scanner configured to read bar code information directly from items being considered for purchase. The mobile terminal is further configured to communicate with a store network computer by means of an individually addressable radio frequency communication transceiver. Processed information is displayed to the customer on an LCD display panel. The mobile terminal further includes a reader/writer unit for interfacing with a customer ID card and a memory for storing data received either from the store network computer, the customer ID card, or both. The customer scans their item and places it in a bag inside their cart. The item identification SKU that is read by the barcode scanner is linked to the real time inventory control system on the store network computer. The SKU number relates the item's product description and cost as well as other information.

BRIEF SUMMARY OF THE INVENTION

Illustrative embodiments provide a computer implemented method, data processing system, and computer program product for tracking time sensitive items in a container. A barcode scanned item is placed into a container. The system stores the time of the scan and links the item identification number scanned to the inventory control system. As the time since the item was scanned increases, the system determines whether the item has exceeded a time-based alert threshold. Responsive to exceeding the time-based alert threshold, personnel are alerted to the abandoned container. The system provides data to the personnel to aid in dispositioning the item following abandonment.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 8A, 8B and 8C show three examples of shopping cart histories and time-based alert thresholds in accordance with the illustrative embodiments;

DETAILED DESCRIPTION OF THE INVENTION

Figure 1:
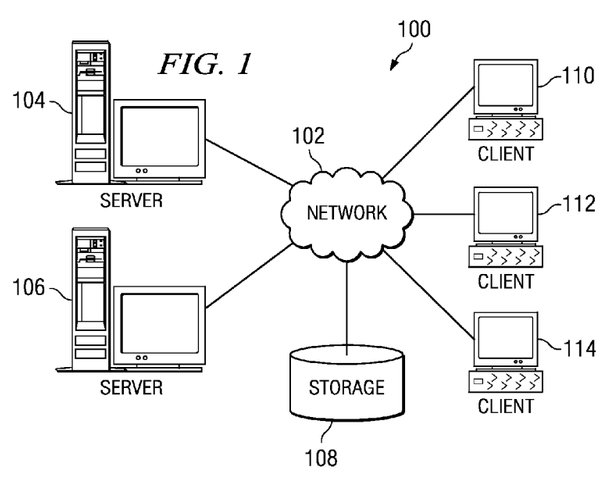
FIG. 1 depicts a pictorial representation of a network of data processing systems in which illustrative embodiments may be implemented.
Figure 2:
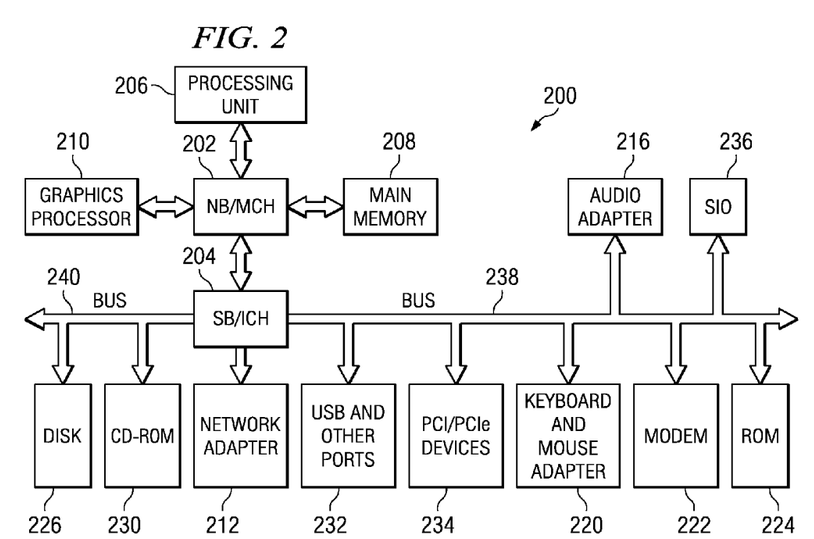
FIG. 2, a block diagram of a data processing system, is shown in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 coordinates, and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2.

Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments increase the efficiency with which personnel manage time sensitive items in abandoned or delayed in-transit containers. In particular, the inventory control system allows for calculating alert thresholds and managing personnel alerts when abandoned carts are identified within a grocery store. Other equally important embodiments include such examples as restaurant refrigerators and salad bars, and delivery vehicles.

In accordance with the illustrative embodiments, one or more additional fields are included in the inventory control system database. One such additional field is a time sensitivity factor. The time sensitivity factor provides additional information as to the perishability of the item. For example, a spoilage rate for the item can be calculated using the time sensitivity factor, along with other information currently stored in inventory control systems, such as the weight of an item, or whether an item is frozen or refrigerated. A high time dependency factor indicates that the item is highly time sensitive and therefore will perish quickly when in the ambient store temperature. A low time dependency factor indicates that the item is unlikely to spoil in the ambient store environment. One of ordinary skill in the art may implement similar rating systems and remain within the spirit of the illustrated embodiment. A superseding attribute may also be added to the inventory control system that indicates that the item has a high priority to be recovered upon identification of abandonment. Superseding attribute items, when abandoned, may cause a comfort or safety issue.

After the item is scanned by the customer and placed in a shopping cart, a time stamp is stored with the item identification in the shopping cart history. The shopping cart history may be displayed on the mobile barcode scanner, as well as the personnel terminal. The information is stored in the computer network. As the second item is scanned, a second time stamp for the second item is stored with the second item's identification in the shopping cart history. The scanning and placing process continues until either the customer pays for the items in the shopping cart or the shopping cart containing the items is abandoned. If the customer pays for the items, the shopping cart history will indicate that the customer has completed the transaction. The inventory control database is updated to indicate the items are no longer in inventory.

If the customer does not pay for the items and instead abandons the cart, it may take several minutes for the cart to be identified as abandoned. The identification of the abandoned shopping cart may be implemented by several methods. In one embodiment, the cart will be identified if the mobile scanning system is inactive for a configurable period of time. In another method, the system will detect the non-movement of the cart if either the cart or the scanning system on the cart is equipped with radio frequency identification (RFID). Alternatively, the cart may be recognized by an in store camera system that detects the cart has not moved in a set number of minutes. Those of ordinary skill in the art may appreciate that there are other ways of determining the cart has been abandoned.

Once the cart has been identified as abandoned, the system checks the contents of the cart in the shopping cart history. If the system ascertains that the cart contains items that are in danger of spoiling, the system will alert personnel, in accordance with the illustrative embodiments. Alternatively, the system may decide it is not cost effective to alert personnel. It may not be cost effective to send a customer liaison to leave a line of customers to retrieve a cart that has a 52 cent item of yogurt contained inside. However, it may be worth the employee's immediate attention if the cart contains many such items or a single high cost perishable item such as filet mignon. Another factor that may indicate immediate action on the part of the employee is if the spoilage causes a health or safety factor, such as a bag of ice melting and causing a puddle in a store aisle. In the case of the ice melting, the cost of the ice may not cause a time-based alert threshold to be raised; however, a superseding factor may be used to identify a customer comfort or safety issue. A time-based alert threshold is a user defined time elapsed before an alert is raised.

Figure 3:
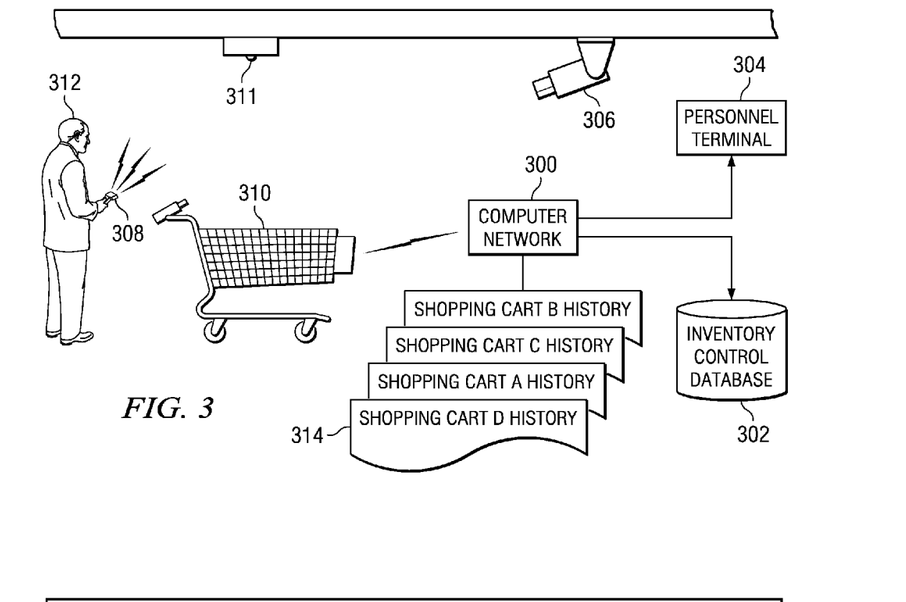
FIG. 3 depicts a block diagram illustrating components in a retail environment in which illustrative embodiments may be implemented.

FIG. 3 depicts a block diagram illustrating components in a retail environment in which illustrative embodiments may be implemented. The hub of the system is store computer network 300. Computer network 300 is a network such as element 100 in FIG. 1.

Computer network 300 is networked with Inventory Control Database 302 and Personnel Terminal 304. Inventory control database 302 is the storage component of an inventory control system.

In communication with computer network 300 are in store camera system 306, mobile barcode scanner 308, and, optionally, shopping cart 310. In this illustrative example, infrared beacons 311 are placed in the ceilings and doorways throughout the store. Infrared beacons 311 provide location information to computer network 300. The customer 312 is scanning the items and placing them in the cart. Computer network 300 displays shopping cart history 314 to either shopping cart 310 or personnel terminal 304.

Figure 4:
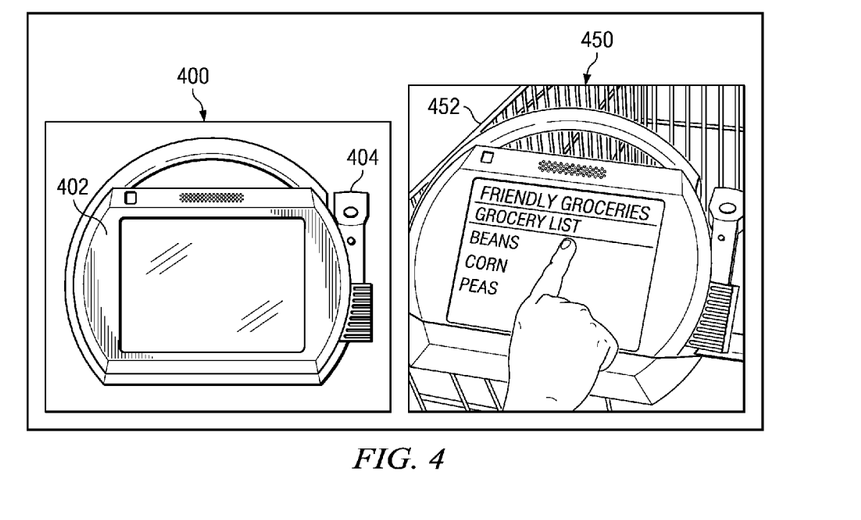
FIG. 4 is a depiction of a mobile barcode scanning system mounted on a shopping cart in which illustrative embodiments may be implemented.

FIG. 4 is a depiction of a mobile barcode scanning system mounted on a shopping cart in which illustrative embodiments may be implemented. A shopping cart barcode scanner is a computer peripheral attached to a cart mounted computer or a handheld computer bundled with a barcode scanner. Several examples of such systems include Fujitsu's Shopping Buddy™, which is a trademark of Fujitsu Computer Systems, headquartered in Sunnyvale, Calif., and IBM Mobile Tablet for Retail™, which is a trademark of International Business Machines Corporation. Mobile Tablet for Retail™ 400 is a wireless, touch-screen, browser that customers attach to their shopping carts. Touch screen unit 402 optionally mounts to a shopping cart. Hand held barcode scanner 404 is shown resting in the scanner cradle located on touch screen unit 402. Picture 450 shows Mobile Tablet for Retail™ 400 attached to shopping cart 452.

Wireless transmissions from the shopping carts may be short-range transmissions. These short-range transmissions may take various forms, such as, for example, very low power radio frequency (RF), wireless fidelity (Wi-Fi), and Bluetooth. Wi-Fi refers to a set of I.E.E.E. standards, for example 802.11a and 802.11b, for wireless transmissions. Bluetooth is a wireless personal area network (PAN) technology from the Bluetooth Special Interest Group. Bluetooth is an open standard for short-range transmission of digital voice and data between mobile devices and desktop devices. This standard supports point-to-point and multipoint applications. Those of ordinary skill in the art will appreciate that the hardware may vary depending on the implementation.

Figure 5:
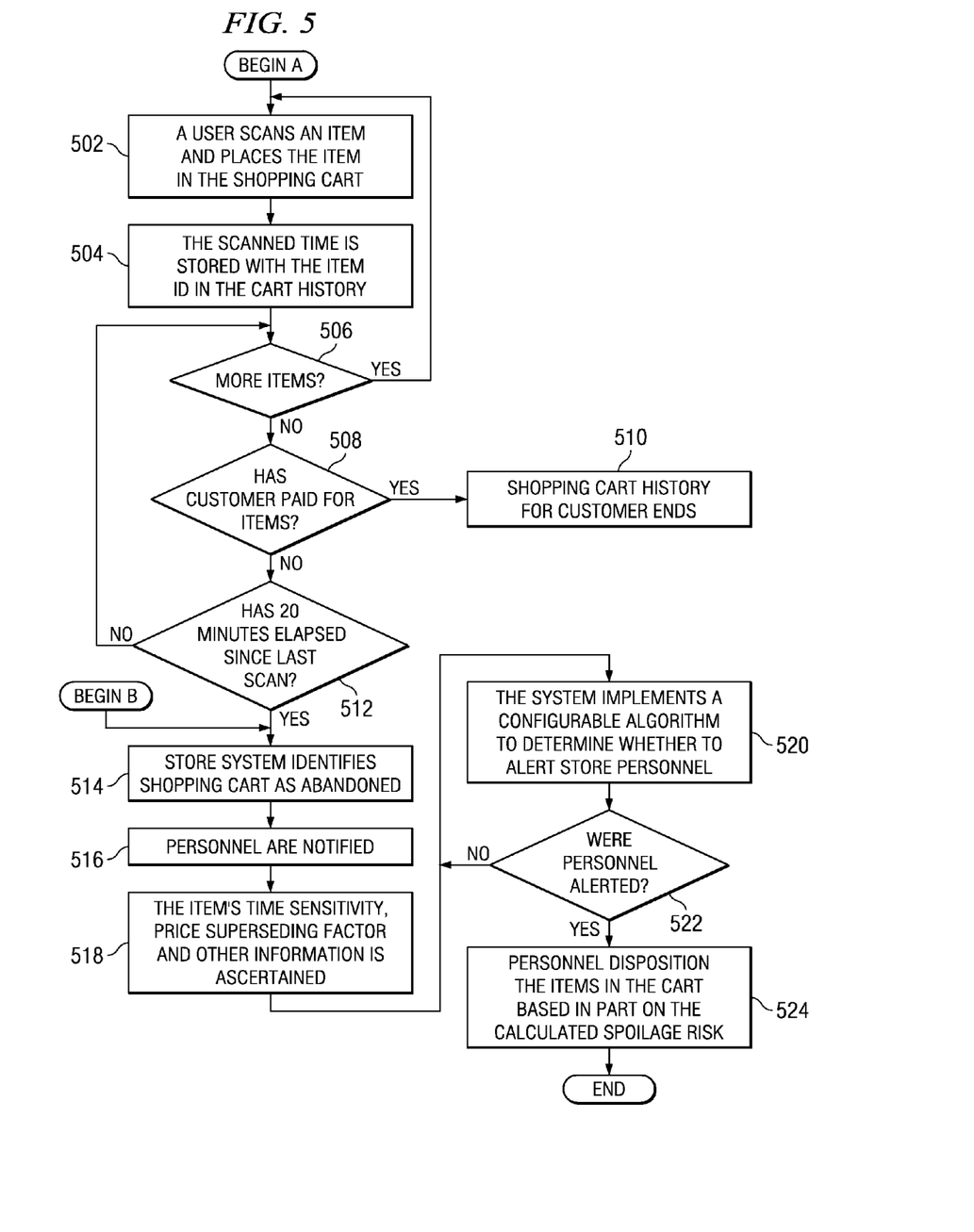
FIG. 5 is a flow chart of a system to alert personnel of perishable items in an abandoned shopping cart in accordance with the illustrative embodiments.

FIG. 5 is a flow chart of a system to alert personnel of perishable items in an abandoned shopping cart in accordance with the illustrative embodiments. Process A begins when a user, in this example the grocery store customer, scans the barcode of an item and places the item in the shopping cart (step 502). The item may be scanned by a hand held scanner, as well as other methods of scanning such as an automatic shopping cart scanner. The grocery store is equipped with an inventory control database linked to the store's computer network as element 300 in FIG. 3.

In accordance with the illustrative embodiments, a time sensitivity factor is included in the inventory control database. When the SKU number of the item is scanned, the time of the scan is stored with the SKU in the computer network (step 504). The SKU number and the time stamp are associated with the shopping cart. If there are more items (step 506), the customer continues shopping, by scanning and placing further items in the shopping cart (step 502). Each time an item is scanned, the SKU and the time stamp of the item are stored in the shopping cart history (step 504). If there are no more items scanned (step 506), the system determines whether the customer has paid for the items (step 508). If the customer has paid for the items, the shopping cart history for the customer ends (step 510), thus terminating the process.

However, if the customer has not paid for the items, the system determines whether a specified time period has elapsed since the last scan (step 512). While step 512 shows a 20 minute time period, those of ordinary skill in the art can appreciate that the time period may be set to any time. To aid in illustrating the embodiments of the invention, twenty minutes is the time period specified for this example. The time period is optionally configurable by the store personnel. If the time elapsed since the last scan is less than twenty minutes, the system waits for more items (step 506) to be scanned or for the customer to pay for the items (step 510). If twenty minutes has elapsed since the last scan (step 512), the system identifies the shopping cart as abandoned (step 514) and notifies personnel (step 516). Personnel may be notified and the personnel terminal may receive a message that a cart has been abandoned. The notification is giving information to personnel that there is a cart abandoned, but a mere notification does not alert the personnel to take immediate action. A time-based alert threshold is a system calculated number based on parameters stored in the inventory control database. a time-based alert threshold is the number that must be reached to trigger a store alert.

The process may also begin at step 514 if a shopping cart is identified as abandoned by an alternate method. A shopping cart may be identified as abandoned in many ways. The cart may be RFID tagged and the store monitoring system could notice the cart has not moved within a particular time frame. Personnel could notice a customer walk out of the store and leave the shopping cart, or some other way of determining the cart is abandoned.

Once the cart has been identified as abandoned (step 514), the item's time sensitivity, price, superseding factors, and other information are retrieved from the inventory control database as in FIG. 3 (step 518). The system then implements a configurable algorithm to determine whether to alert store personnel (step 520). Alerting store personnel may be done in a similar manner as notification. However, the alert may take on a more urgent tone and may be linked to the store's public address system. The system looks at the history of the shopping cart, analyzes each item in the cart, and calculates an elapsed time for each item. The system uses the time sensitivity factor to determine a spoilage rate. The system may implement a configurable algorithm taking into account the price of an item, the alert threshold not being triggered unless the cost of spoilage is high. The system determines if personnel have been alerted (step 522). If personnel have not been alerted, the system reruns the algorithm, since one of the variables used by the algorithm is time dependent (step 520). If the personnel are alerted, personnel can disposition each item in the cart using the calculated spoilage rate determined by the algorithm (step 524), thus the process ends.

Figure 6:
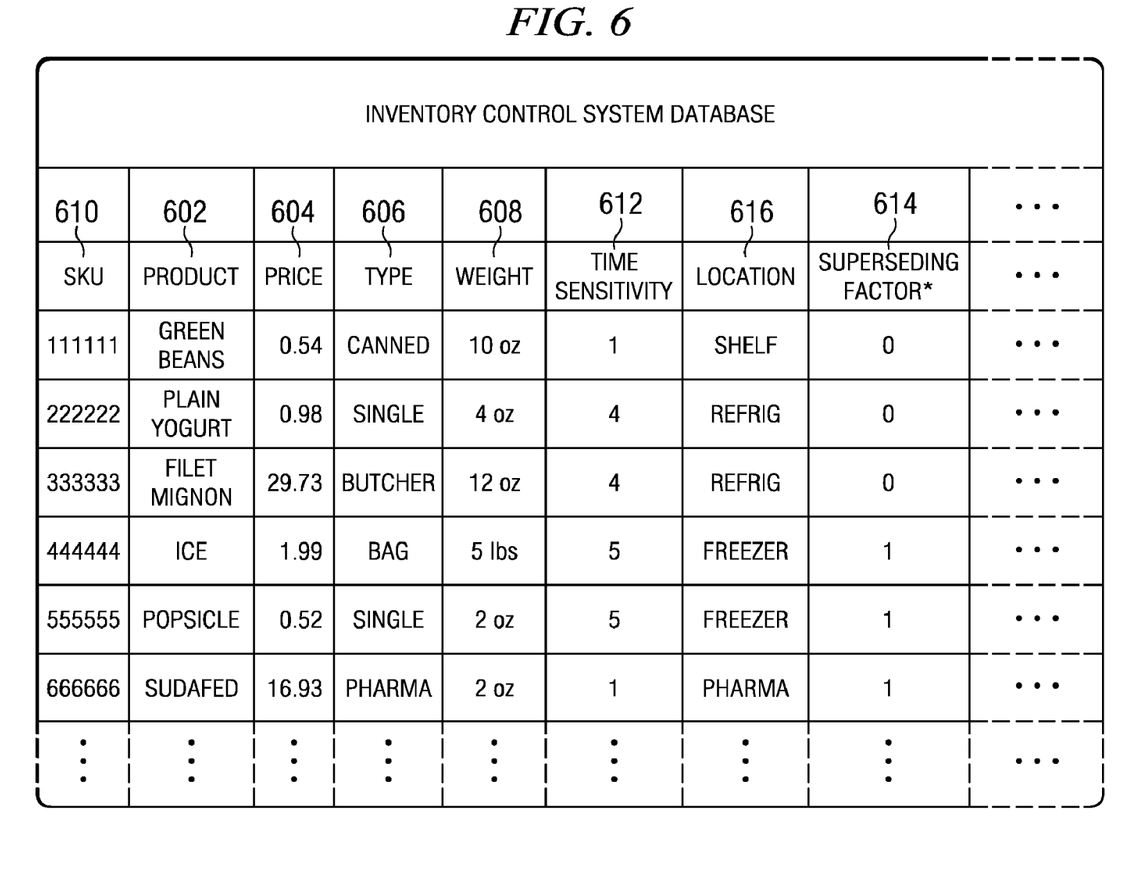
FIG. 6 is a representation of a portion of an inventory control database in accordance with the illustrative embodiments.

FIG. 6 is a representation of a portion of an inventory control database, in accordance with the illustrative embodiments. Product name 602, price 604, and other data, such as type 606 and weight 608, are associated with an item's SKU number 610. In accordance with the illustrative embodiments, time sensitivity 612 and, optionally, location 616 and superseding factor 614 are also included in the inventory control database. Time sensitivity is a parameter that predicts a time dependency, in other words, a rate of spoilage. A superseding factor may be optionally added to the inventory control database. Those of ordinary skill in the art may appreciate that other refinements and other such parameters are within the spirit of the illustrative embodiments.

Figure 7:
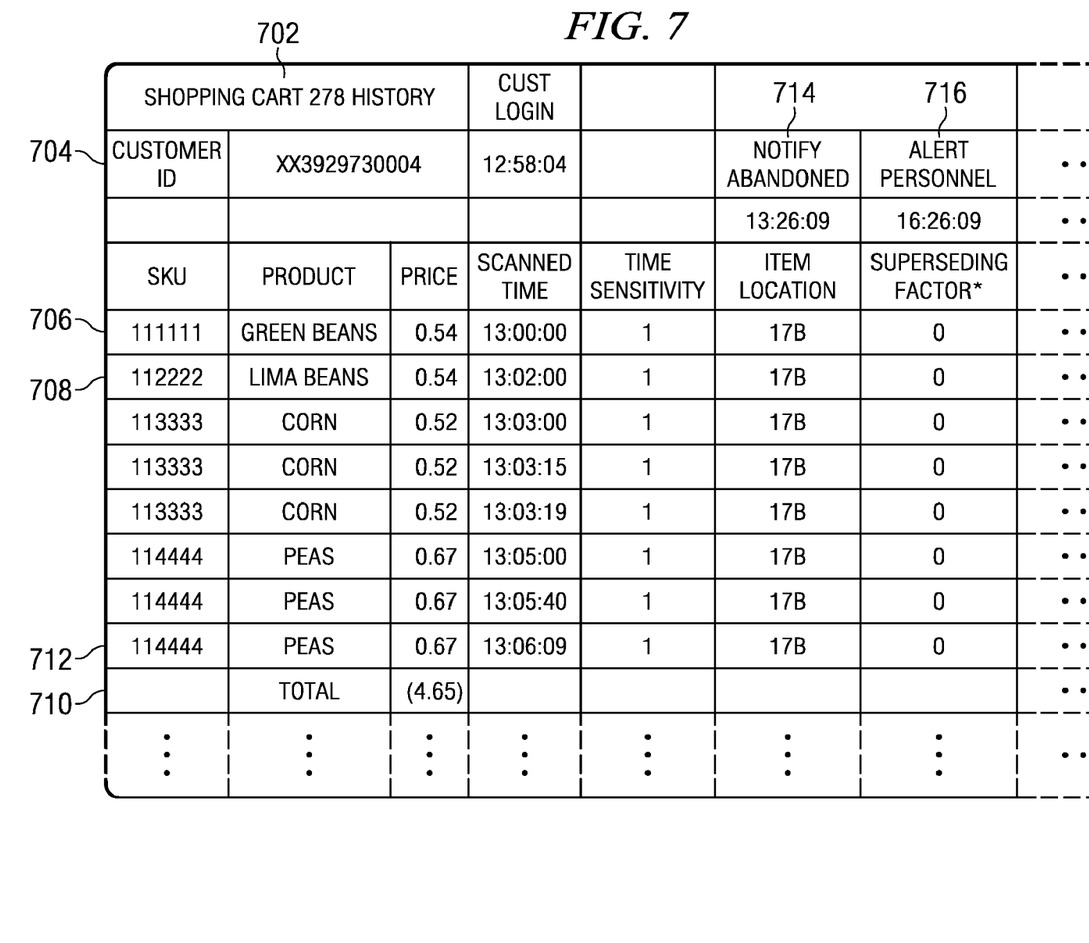
FIG. 7 is a representation of a portion of a shopping cart history in accordance with the illustrative embodiments.

FIG. 7 is a representation of a portion of a shopping cart history, in accordance with the illustrative embodiments. FIG. 7 illustrates an example of the way various configurations of the algorithm determine when to alert store personnel. The shopping cart history recognizes when a new shopping trip has begun. This is accomplished through a software initialization the customer implements upon first logging in to the shopping cart barcode scanner system.

Heading 702 indicates that this history is for shopping cart '278.' The identification number could be for the physical shopping cart or for the barcode reader attached to the shopping cart. Line 704 displays the customer number 'XX3929730004', which is obtained through a card scan during customer initialization of the cart. The shopping cart initiation may be implemented by scanning a customer id card into the cart system, or some other method of reinitializing the cart system. In one embodiment, the item's location in the store is monitored by leveraging the location infrastructure included with the mobile barcode scanning system, thus determining a location of the scan.

The time the cart was initialized '12:58:04' is also displayed. The shopping cart history contains the list of items that have been scanned since the shopping cart was initiated by the user. First line 706 displays 111111 as the SKU associated with the first item scanned by the cart system. SKU 111111 identifies a can of green beans; the can's price is 54 cents. Along with other information, the system contains a time sensitivity rate and the time when the item was scanned. In this example, a can of green beans has the time sensitivity rate of 1 in the example, indicating a slow rate of perishability. The can of green beans has a superseding factor of 0, indicating there is no special urgency in recovering this item. The scanned time is 13:00:00.

Second line 708, lists the second item scanned. The information for item two is as follows: SKU 112222, product lima beans, price 54 cents, time scanned 13:02:00, time sensitivity 1, superseding factor 0. Line 712 displays the last item scanned. The scanned time of the last item is 13:06:09. Cart 278 contains only can goods with low perishability ratings. In accordance with the illustrative embodiments, the store personnel may be notified of the abandoned cart; however, the store may not be alerted until some configurable default number of hours is reached. In this example, the enterprise wide number of twenty minutes has been set to notify personnel that a cart has been abandoned. Those of ordinary skill in the art will appreciate that the times used in these examples may be user configurable and may be set to any time. A three hour store wide number has been set to alert personnel. In other words, personnel will merely be notified 714 at '13:26:09' and will be alerted 716 to take action at '16:26:09.'

Figure 8A:
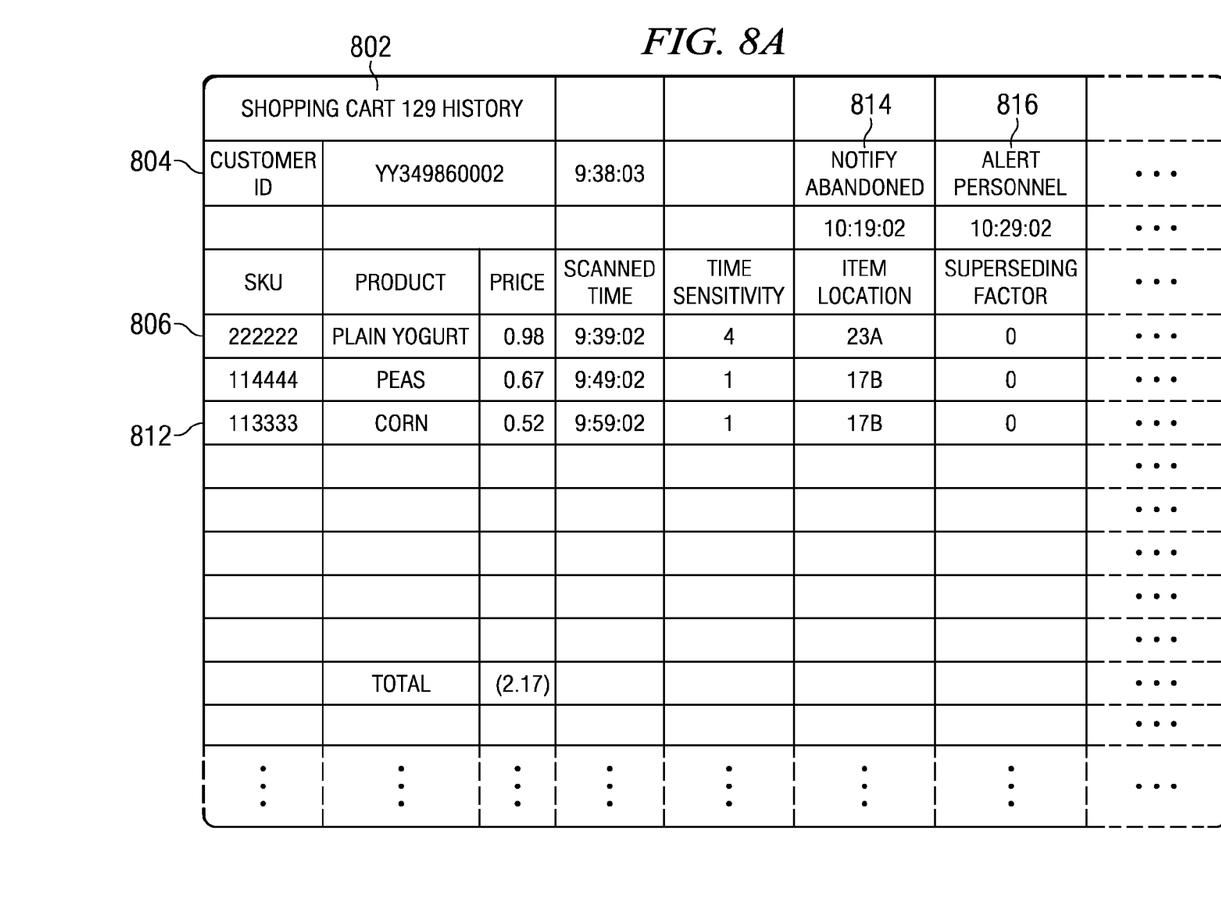
FIG. 8A is an example of shopping cart history and a time-based alert threshold in a recovery driven configuration in accordance with the illustrative embodiments.
Figure 8B:
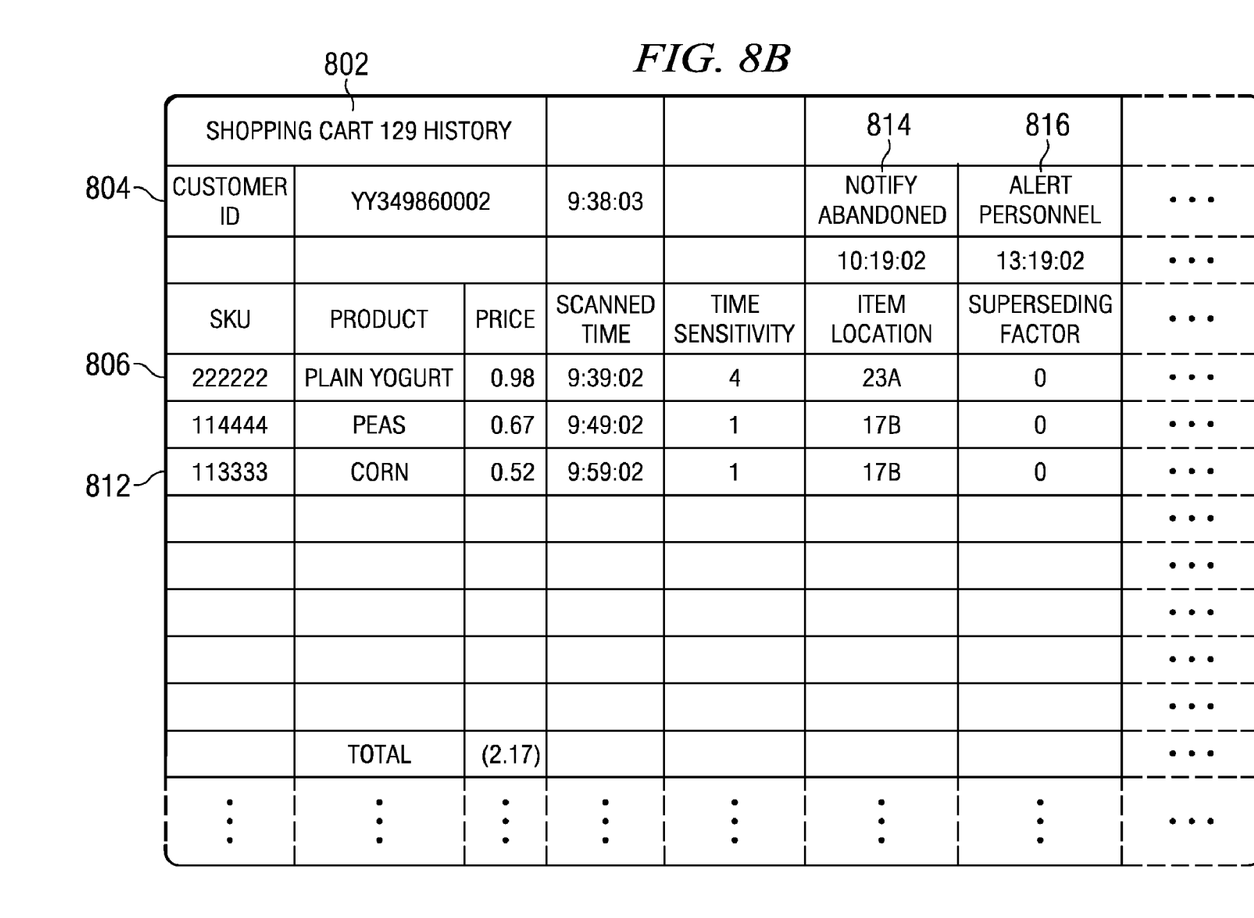
FIG. 8B is an example of shopping cart history and an in a cost driven configuration in accordance with the illustrative embodiments.
Figure 8C:
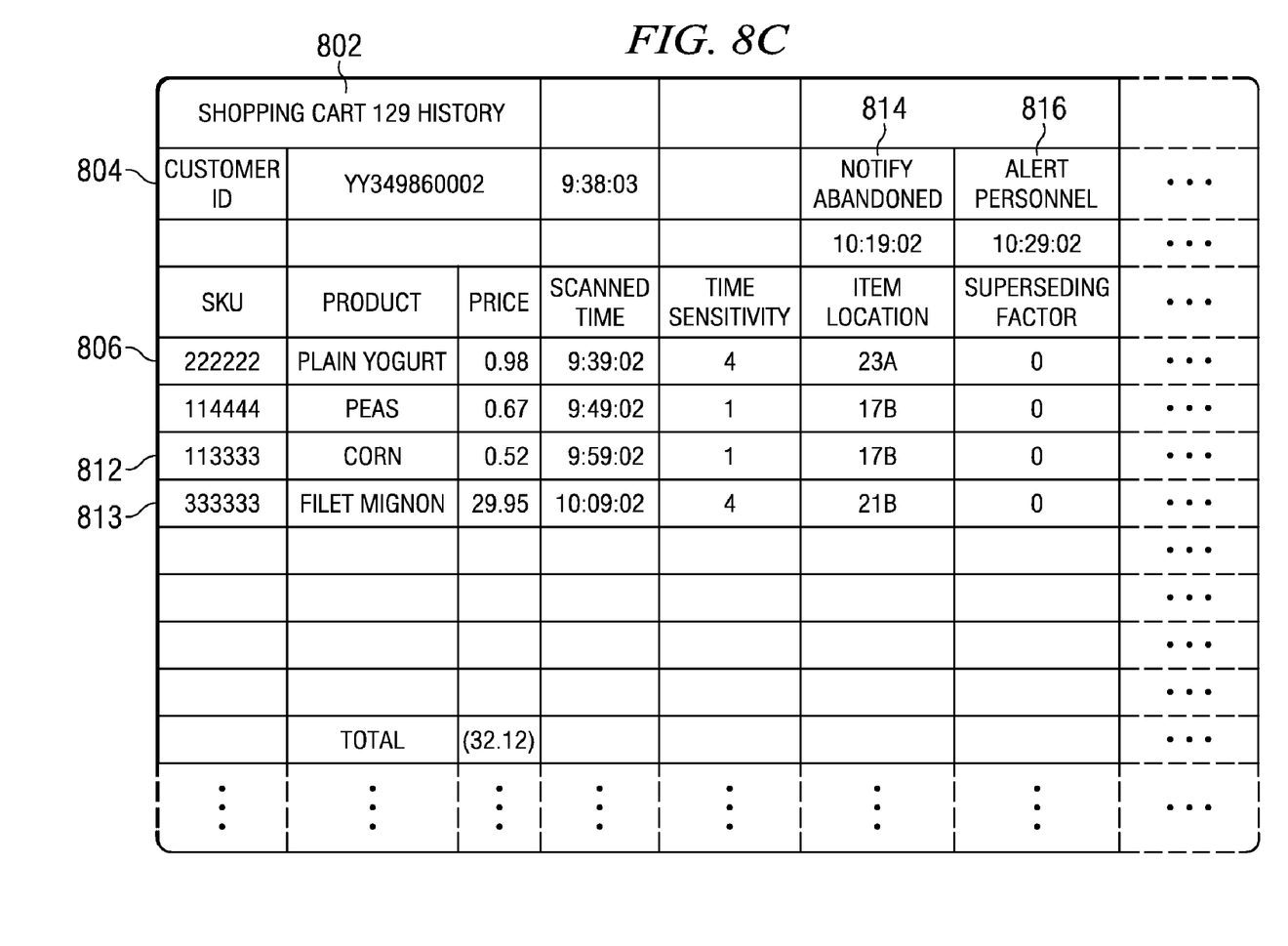
FIG. 8C is another example of shopping cart history and a time-based alert threshold in a cost driven configuration in accordance with the illustrative embodiments.

FIGS. 8A, 8B, and 8C show three examples of shopping cart histories and alert thresholds, in accordance with the illustrative embodiments. FIG. 8 illustrates examples of the way various configurations of the algorithm may handle alerting store personnel.

FIG. 8A is an example of shopping cart history and a time-based alert threshold in a recovery driven configuration, in accordance with the illustrative embodiments. FIG. 8A illustrates an example wherein the store policy is to recover items as soon as possible. Heading 802 indicates that this history is for shopping cart '129.' Again, the identification number could be for the physical shopping cart or for the barcode reader attached to the shopping cart. Line 804 displays the customer number 'YY349860002', which is obtained through a card scan during customer initialization of the cart. The time the cart was initialized '09:38:03' is also displayed. The shopping cart history contains the list of items that have been scanned since the shopping cart was initiated by the user.

First line 806 displays the following information for the first item scanned: SKU 222222, product plain yogurt, price 98 cents, scanned time 09:39:02, time sensitivity 4, and superseding factor 0. Last line 812 displays the last item scanned in cart 129. The last item is a can of corn with SKU 113333. The price of the corn is 52 cents. The time sensitivity is 1 and the scanned time is 09:59:02. The system algorithm could be configured to make different conclusions based on store or enterprise wide policy. In this configuration, the alert threshold may be set to a specified time after the cart has been identified as abandoned. Notify Abandoned 814 displays the time that the cart is identified as abandoned. The time is displayed, but depending on store policy, store personnel may take no action. This example shows the specified time as 10 minutes after the cart has been identified as abandoned 816. This configuration is based on a store policy of immediate recovery of abandoned items.

FIG. 8B illustrates an example configuration if the store policy is cost driven. This is the same shopping cart history as shown in FIG. 8A. Heading 802 indicates that this history is for shopping cart '129.' Line 804 displays the customer number 'YY349860002', which is obtained through a card scan during customer initialization of the cart. The shopping cart history contains the list of items that have been scanned since the shopping cart was initiated by the user.

First line 806 displays the following information for the first item scanned: SKU 222222, product plain yogurt, price 98 cents, scanned time 09:39:02, time sensitivity 4, and superseding factor 0. Last line 812 displays the last item scanned in cart 129. The last item is a can of corn with SKU 113333. The price of the corn is 52 cents. The time sensitivity is 1 and the scanned time is 09:59:02. In this configuration, the alert threshold, and therefore the alert personnel time, is different. If store policy for recovery of abandoned items is based on cost, the alert threshold is not triggered based on the scanned time of the yogurt. The container of yogurt may not trigger a store alert even though the yogurt has a high time sensitivity rate, and the cart is identified as abandoned. The cost to the store of redirecting personnel to recover the container of yogurt may not warrant the attention.

FIG. 8C illustrates a shopping cart history that is the same as the shopping cart history of FIGS. 8A and 8B, except that an additional item was scanned. In line 813, a filet mignon with a SKU of 333333, a cost of $29.95, time sensitivity of 4, was scanned at 10:09:02. In this example, the system is configured to reach a time-based alert threshold based on a cost driven store policy. The cost of the item justifies the personnel redirection. The 'Notify Abandoned' time is 10:29:02 and the potential cost in spoilage is $29.95. The algorithm may be configured to trigger an alert in a specified time, 10 minutes in this example, or trigger an immediate alert upon identification of abandonment.

Personnel dispatched to recover the items can use a potential spoilage rate. The potential spoilage rate is calculated by the system using the scanned time and the current time to determine an elapsed time in the cart, and time sensitivity, as well as other information. In dispositioning the above example shopping cart, personnel may discard the yogurt. Assuming a response time is several minutes for personnel to recover the cart, the elapsed time of the yogurt in the cart is 1 hour (current time 10:39:02-scanned time 09:39:02). The filet mignon has an elapsed time of 30 minutes (10:39:02-10:09:02) and may be safely recovered. The cart location at the scanned time may aid in quickly directing personnel to the rightful location of the recovered items.

Figure 9:
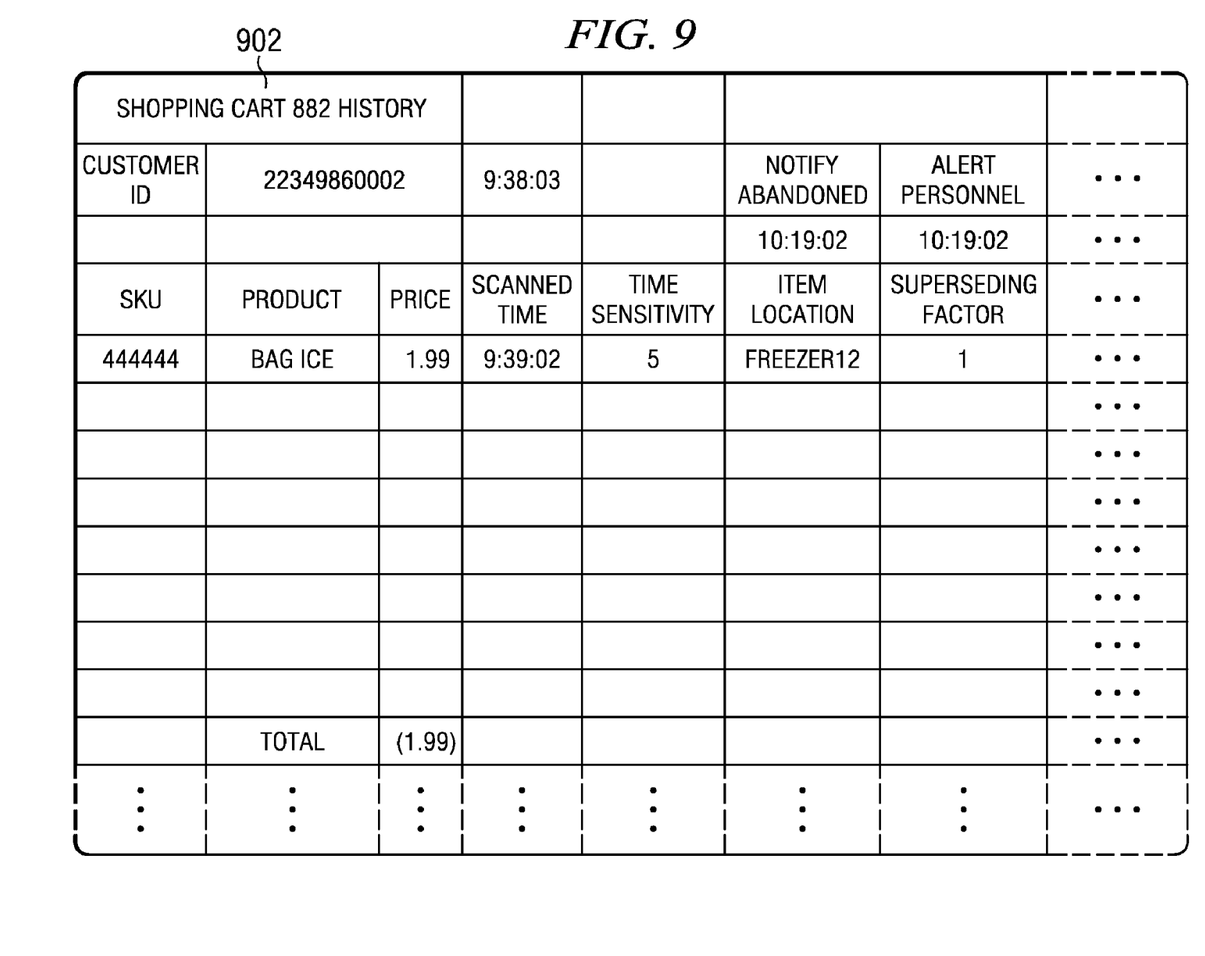
FIG. 9 is yet another representation of a portion of a shopping cart history and a time-based alert threshold illustrating the use of an optional superseding factor, in accordance with the illustrative embodiments.

FIG. 9 is a representation of a portion of a shopping cart history, in accordance with the illustrative embodiments. FIG. 9 illustrates yet another example of the way various configurations of the algorithm may calculate a time-based alert threshold. Heading 902 indicates that this history is for shopping cart '882'. The only item scanned into shopping cart 882 is a bag of ice. The bag of ice contains a time sensitivity of 5; however, the cost of the bag of ice is $1.99. The algorithm may not be configured to trigger an alert based on this cost. The bag of ice may quickly melt and cause a safety issue for customers; therefore, the system may be configured with a superseding factor flagged. The flagged superseding factor would cause an alarm to be triggered upon notification of abandonment. Other items that may have a flagged superseding factor may be pharmaceuticals, chemicals and small weight frozen items such as an ice cream bar. The system could also be configured to account for these special items by increasing a time sensitivity factor for the items.

The specifics of the algorithm and the default numbers may be user configurable at the store level or at the enterprise level. Some of the factors that may be user configurable are whether spoilage rate is wholly calculated off of the time sensitivity factor and elapsed time, or if other factors, such as the ambient temperature of the store or the weight of the item, are used in calculations. The weight of the item would be useful in the calculation in a comparison example of the spoilage rate of a 25-pound frozen turkey versus a 0.5-pound frozen turkey breast, since the weight of the product may be a determining factor in a spoilage rate. Another of the illustrative embodiments uses only parameters stored in a legacy inventory control system to calculate the spoilage rate and alert threshold of an item.

The embodiments illustrate a method, computer implemented instructions, and a computer program product that automatically alerts store personnel to an abandoned cart containing perishable items, to help reduce the amount of spoilage and loss that occurs in a retail store. The system analyzes the set of items within a cart to determine if any of the items are perishable. The system keeps track of how long each item has been in a cart and how long it has been since the cart has seen activity. Lastly, if the store has the capability, personnel can be directed to the location of the cart.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for tracking time sensitive items in a cart, the computer implemented method comprising:

identifying a cart determined as an abandoned cart, the abandoned cart containing an item identified by a barcode that has been scanned, wherein the cart is determined as abandoned after a period of inactivity;

determining whether the item in the abandoned cart has exceeded a time-based alert threshold; and responsive to determining that the item has exceeded the time-based alert threshold, alerting personnel of the abandoned cart.

2. The computer implemented method of claim 1, wherein the identifying step further comprises:

notifying personnel of the item in the abandoned cart.

3. The computer implemented method of claim 1, wherein the determining step further comprises:

calculating a spoilage rate for the item based on a time sensitivity and an ambient temperature of the environment of the item in the abandoned cart.

4. The computer implemented method of claim 1, wherein the determining step further comprises:

determining whether the item in the abandoned cart has exceeded the time-based alert threshold based on a spoilage rate and an elapsed time in the abandoned cart.

5. The computer implemented method of claim 4, wherein the determining step further comprises:

determining whether the item has exceeded the time-based alert threshold based on the spoilage rate of the item, the elapsed time in the abandoned cart, and exceeding a monetary value in the abandoned cart.

6. The computer implemented method of claim 5, further comprising:

dispositioning the item in the abandoned cart, using a calculated spoilage rate based on an elapsed time in the abandoned cart and a time sensitivity factor.

7. The computer implemented method of claim 1, wherein the determining step further comprises:

determining whether the item in the abandoned cart has exceeded the time-based alert threshold based on a superseding factor.

8. The computer implemented method of claim 1, wherein the alerting step further comprises:

informing personnel of a location of the abandoned cart.

9. The computer implemented method of claim 1, wherein the period of inactivity that determines whether the cart is abandoned comprises an elapsed time the cart is stationary.

10. The computer implemented method of claim 1, wherein the period of inactivity that determines whether the cart is abandoned comprises an elapsed time since a mobile scanning system was active.

* * * * *